US007708334B2

(12) United States Patent
Yamada et al.

(10) Patent No.: US 7,708,334 B2
(45) Date of Patent: May 4, 2010

(54) SLIDE DOOR APPARATUS FOR VEHICLE

(75) Inventors: Katsuhisa Yamada, West Bloomfield, MI (US); Yasuhiro Yamakawa, Toyohashi (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 67 days.

(21) Appl. No.: 12/131,505

(22) Filed: Jun. 2, 2008

(65) Prior Publication Data

US 2008/0302018 A1 Dec. 11, 2008

(30) Foreign Application Priority Data

Jun. 5, 2007 (JP) ............................ 2007-149381

(51) Int. Cl.
*B60J 5/06* (2006.01)

(52) U.S. Cl. ...................... 296/146.4; 296/155; 49/262; 49/360

(58) Field of Classification Search .............. 296/146.4, 296/155; 49/262, 360, 363
See application file for complete search history.

(56) References Cited

U.S. PATENT DOCUMENTS 6,009,671 A * 1/2000 Sasaki et al. .................. 49/352
6,530,619 B2 * 3/2003 Fukumoto et al. ........... 296/155
6,659,539 B2 * 12/2003 Yogo et al. .................. 296/155
6,935,071 B2 * 8/2005 Yokomori et al. ............. 49/360
7,134,241 B2 * 11/2006 Suzuki .......................... 49/28
7,288,907 B2 * 10/2007 Kamiya et al. .............. 318/266
7,533,926 B2 * 5/2009 Mitsui et al. ................ 296/155
2006/0168891 A1 * 8/2006 Aoyama et al. ............... 49/360

FOREIGN PATENT DOCUMENTS

JP 2003-082927 A 3/2003

* cited by examiner

*Primary Examiner*—Jason S Morrow
(74) *Attorney, Agent, or Firm*—Buchanan Ingersoll & Rooney PC

(57) ABSTRACT

A slide door apparatus for a vehicle includes a driving device mounted to a slide door and a guide pulley unit mounted to the slide door. The guide pulley unit includes a plurality of guide pulleys each having first and second guide grooves. The guide pulley unit further includes first and second housing members for housing the plurality of guide pulleys, and a separating member provided between the first and second housing members for separating the first and second guide grooves of each of the plurality of guide pulleys. The slide door apparatus further includes a cable connected to the driving device and to a vehicle body. A first portion of the cable is disposed into the first groove of each of the plurality of guide pulleys. A second portion of the cable is disposed into the second groove of each of the plurality of guide pulleys.

3 Claims, 8 Drawing Sheets

SLIDE DOOR APPARATUS FOR VEHICLE

CROSS REFERENCE TO RELATED APPLICATIONS

This application is based on and claims priority under 35 U.S.C. §119 to Japanese Patent Application 2007-149381, filed on Jun. 5, 2007, the entire content of which is incorporated herein by reference.

FIELD OF THE INVENTION

The present invention generally relates to a slide door apparatus for a vehicle.

BACKGROUND

One of slide door apparatus for a vehicle is disclosed in JP2003-82927A (hereinafter, referred to as reference 1), for example. The slide door apparatus for the vehicle disclosed in the reference 1 includes a guiding rail, which is provided at a vehicle body, and a slide door, which is movably supported to the guiding rail and with which a door opening formed at a side portion of the vehicle body is opened and closed. The slide door incorporates therein a driving device including an electric motor, a drum, for example. Further, one end of a first cable and one end of a second cable are connected to the driving device. Still further, the first cable is provided from the slide door to the vehicle body via one of intermediate pulleys provided in the slide door and plural guide pulleys of a guide pulley unit, and the second cable is provided from the slide door to the vehicle body via another of the intermediate pulleys and the plural guide pulleys. Then, another end of the first cable is connected to the vehicle body at a front side of the guiding rail and another end of the second cable is connected to the vehicle body at a rear side of the guiding rail. Each of the guide pulleys of the guide pulley unit includes two groove portions, which are arranged in parallel in an axial direction and at which the first and second cables are separately disposed, respectively. Thus, a path of the first cable and a path of the second cable do not overlap each other.

So configured, the slide door is moved in a backward direction, i.e., in a direction where the door opening is opened, by unwinding the first cable and winding the second cable, for example, by means of the driving device. Further, on the contrary, the slide door is moved in a forward direction, i.e., in a direction where the door opening is closed, by winding the first cable and unwinding the second cable by the driving device.

The guide pulley unit includes a first housing member and a second housing member for accommodating the plural guide pulleys. The plural guide pulleys are supported by pins, respectively, and one end of each pin is secured to the first housing member and another end of each of pin is secured to the second housing member.

In such a state, when assembling the first and second cables to the guide pulley unit, the plurality of guide pulleys are disposed at corresponding predetermined positions on the first housing member, for example. Then, the second cable is disposed in one of the groove portions of each guide pulley, which is adjacent to the first housing member, so as to correspond to the path of the second cable.

Next, the first cable is disposed in the other one of the groove portions of each guide pulley, which is away from the first housing member (i.e., which is adjacent to the second housing member), so as to correspond to the path of the first cable. Then, the first housing member is covered with the second housing member. The first and second housing members are secured by means of the pins, which are inserted through the corresponding guide pulleys and of which ends are secured to the first and second housing members. Thus, the guide pulleys, at which the first and second cables are disposed, are accommodated in a space defined by the first and second housing members so as to be rotatable about the corresponding pins.

When assembling the first and second cables, the second cable may be disposed in the grove portion where the first cable is to be disposed, and/or the first cable may be disposed in the groove portion where the second cable is to be disposed. Thus, a process for assembling the first and second cables may not be properly executed. Further, a process for preventing such assembling mistake of the first and second cables may be complicated.

A need thus exists for a slide door apparatus for a vehicle which is not susceptible to the drawback mentioned above.

SUMMARY OF THE INVENTION

According to an aspect of the present invention, a slide door apparatus for a vehicle includes a driving device, a guide pulley unit and a cable. The driving device is adapted to be mounted to a slide door supported by a vehicle body for opening and closing an opening formed at the vehicle body. The guide pulley unit is adapted to be mounted to the slide door. The guide pulley unit includes a plurality of guide pulleys each having a first guide groove and a second guide groove, which are arranged axially in parallel to each other. The guide pulley unit further includes a first housing member, a second housing member and a separating member. The first and second housing members are employed for housing the plurality of guide pulleys to be rotatable therein. The separating member is provided between the first and second housing members for separating the first and second guide grooves of each of the plurality of guide pulleys. The cable is connected to the driving device to be wound to and unwound from the driving device. The cable includes a first portion disposed into the first groove of each of the plurality of guide pulleys and one end of the first portion adapted to be connected to the vehicle body at a first side in a moving direction of the slide door. The cable further includes a second portion disposed into the second groove of each of the plurality of guide pulleys and one end of the second portion adapted to be connected to the vehicle body at a second side in the moving direction of the slide door.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 5:
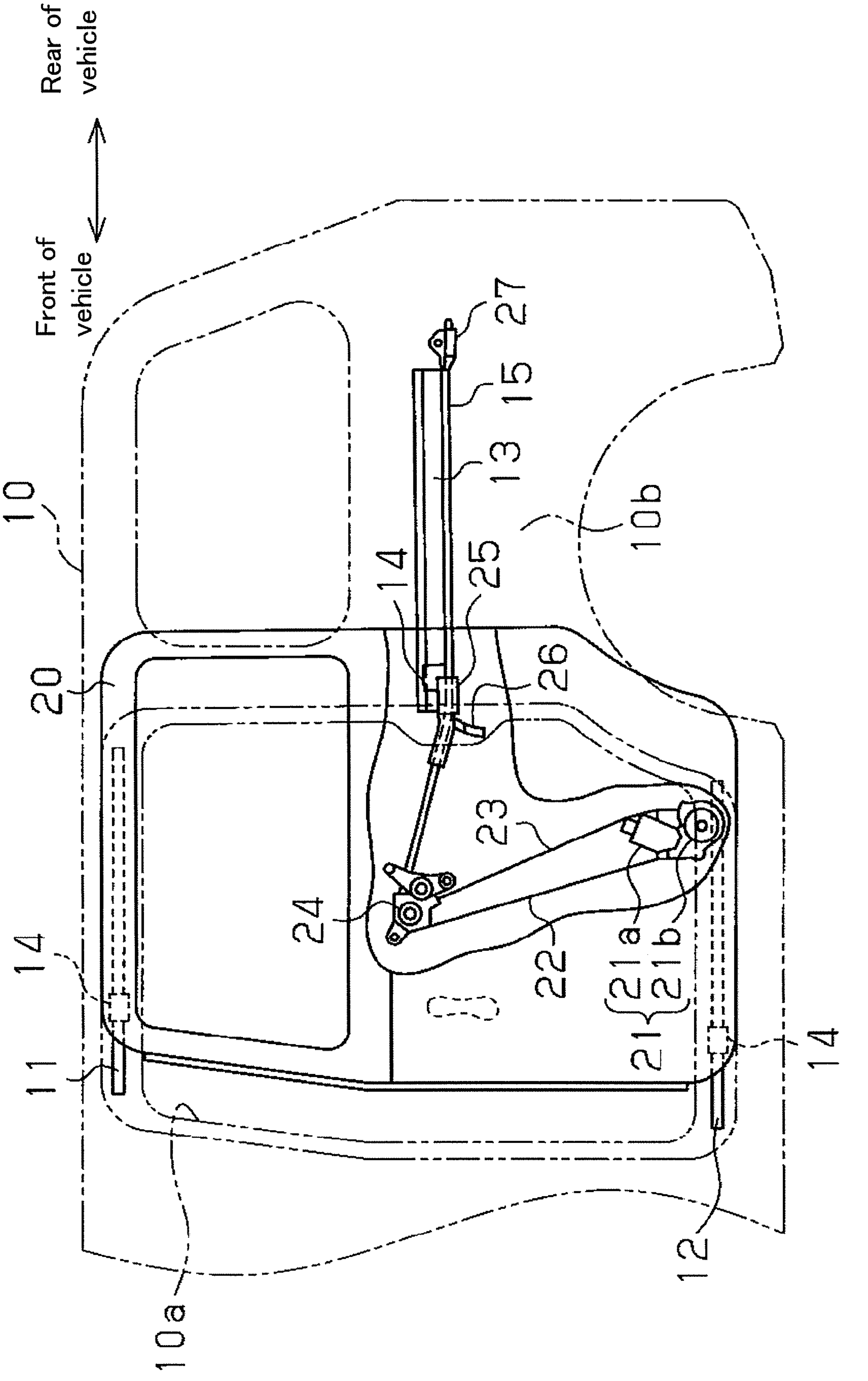
FIG. 5 is a schematic view illustrating a slide door apparatus for a vehicle according to the embodiment.

An embodiment of the present invention will be described hereinafter with reference to the attached drawings. FIG. 5 is a schematic view illustrating a slide door apparatus for a vehicle according to the embodiment. As illustrated therein, an upper rail 11 and a lower rail 12 are provided at a vehicle body 10. More specifically, the upper rail 11 is provided along an upper edge portion of a door opening 10*a* formed at a side portion of the vehicle body 10. The lower rail 12 is provided along a lower edge portion of the door opening 10*a* of the vehicle body 10. Further, a center rail 13 is provided at a quarter panel 10*b* disposed at a rear side of the door opening 10*a*. The center rail 13, which serves as a guiding rail, extends in a longitudinal direction of the vehicle. Guide roller units 14, 14, 14, each of which serves as a supporting member, are mounted to the upper rail 11, the lower rail 12, the center rail 13, respectively. Then, the slide door 20 is supported by the upper rail 11, the lower rail 12 and the center rail 13 via the guide roller units 14, 14, 14 so as to be movable in the longitudinal direction of the vehicle. The door opening 10*a* is opened and closed by the slide door 20 in accordance with a longitudinal movement of the slide door 20. Further, a cable guide 15, which extends along an entire length of a lower edge portion of the center rail 13, is provided at the vehicle body 10.

A driving device 21 is accommodated inside the slide door 20 and is disposed at a lower portion thereof. The driving device 21 includes an electric motor 21*a* and a drum 21*b*. Further, one end of a first cable 22 (serving as a first portion of a cable) and one end of a second cable 23 (serving as a second portion of the cable) are connected to the driving device 21 (the drum 21*b*). By a movement of the driving device 21, one of the first and second cables 22 and 23 is wound to the driving device 21 and the other one of the first and second cables 22 and 23 is unwound (reeled off) from the driving device 21.

The first and second cables 22 and 23 are disposed from the slide door 20 to the vehicle body 10 via an intermediate pulley 24 and a guide pulley unit 25. Further, the first cable 22 is connected to the vehicle body 10 along the cable guide 15 in a front direction of the vehicle, and the second cable 23 is connected to the vehicle body 10 along the cable guide 15 in a rear direction of the vehicle. Additionally, the intermediate pulley 24 and the guide pulley unit 25 are longitudinally disposed, i.e., the intermediate pulley 24 is disposed at a front side and the guide pulley unit 25 is disposed at a rear side, at the vicinity of a door belt line. The guide pulley unit 25 is assembled on the guide roller unit 14 which is provided at the center rail 13. The first cable 22 is guided by the cable guide 15 to be disposed at a front side relative to the second cable 23, and another end 26 (serving as one end of the first portion) of the first cable 22 is connected to the vehicle body 10 at a front end portion of the cable guide 15 (i.e., at a first side in a moving direction of the slide door 20). The second cable 23 is guided by the cable guide 25 to be disposed at a rear side relative to the first cable 22, and another end 27 (serving as one end of the second portion) of the second cable 23 is connected to the vehicle body 10 at a rear end portion of the cable guide 15 (i.e., at a second side in the moving direction of the slide door 20).

So configured, for example, when the first cable 22 is reeled off from the driving device 21 (the drum 21*b*) and the second cable 23 is wound to the driving device 21 (the drum 21*b*) by means of the movement of the driving device 21 (the motor 21*a*), the slide door 20 is moved backwardly, i.e., in a direction where the door opening 10*a* is opened. On the other hand, when the first cable 22 is wound to the driving device 21 and the second cable 23 is reeled off by the movement of the driving device 21, the slide door 20 is moved forwardly, i.e., in a direction where the door opening 10*a* is closed.

A front end portion of each of the upper rail 11, the lower rail 12 and the center rail 13 is gradually bent towards a vehicle compartment. Therefore, an outer surface of the slide door 20 is guided to make a substantially planar surface with a side surface of the vehicle body 10 when the slide door 20, which is supported via the guide roller units 14 of the upper rail 11, the lower rail 12 and the center rail 13, is moved to a position where the door opening 10*a* is fully closed (hereinafter, referred to as a fully-closed position). Further, the slide door 20 is guided further outwardly than the side surface of the vehicle body 10 when the slide door 20 is moved to a position for opening the door opening 10*a* from the fully closed position so that the slide door 20 is allowed to move at the rear side of the door opening 10*a* without interfering with the side surface of the vehicle body 10. The guide roller units 14 of the upper rail 11, the lower rail 12 and the center rail 13 are pivotably movably connected to the slide door 20 so that the slide door 20 is guided to move by the bent portions of the upper rail 11, the lower rail 12 and the center rail 13.

Figure 6:
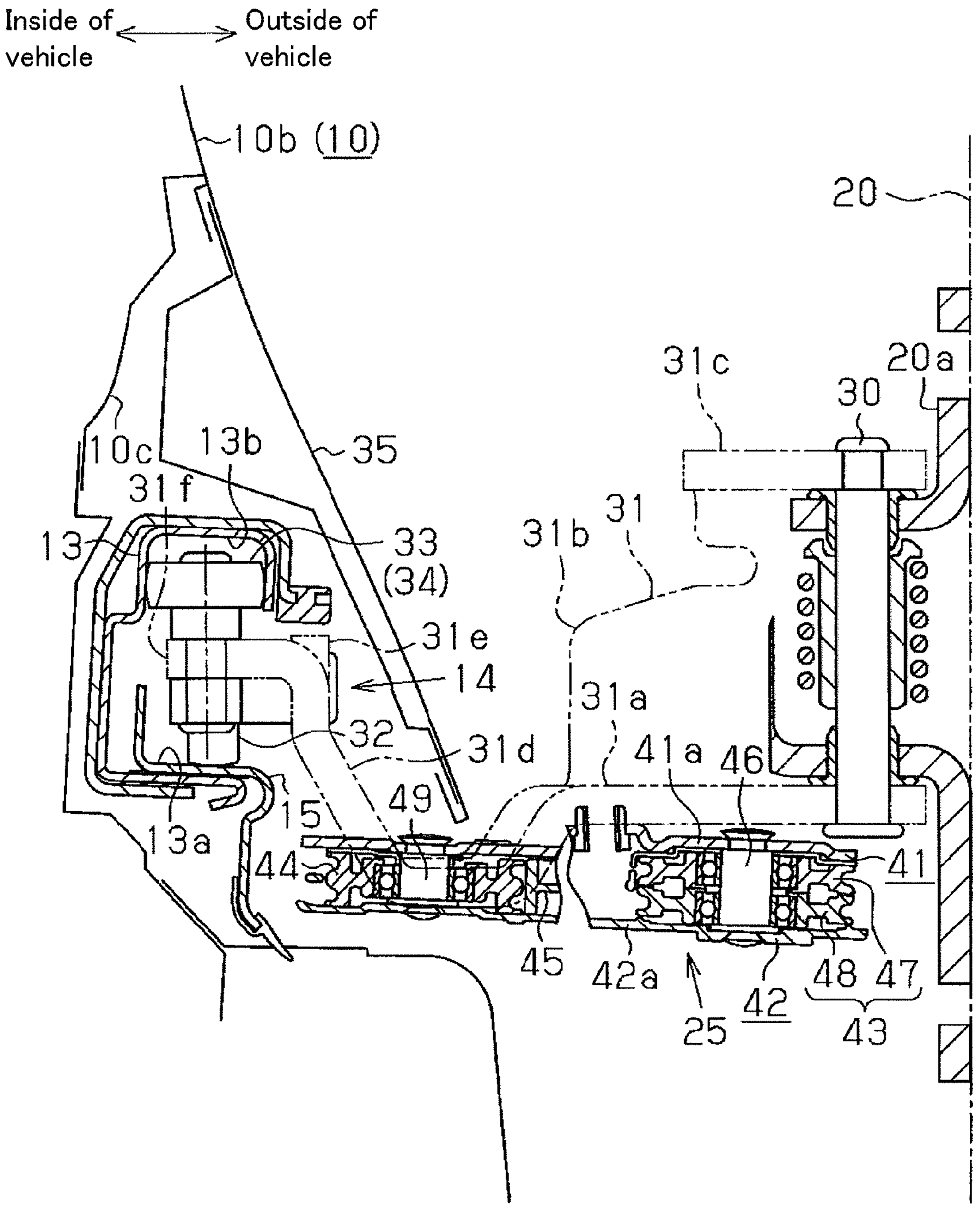
FIG. 6 is a cross sectional view illustrating the slide door apparatus for the vehicle.

Next, the center rail 13 and the guide roller unit 14 of the center rail 13, which relates to the guide pulley unit 25, will be described in detail hereinafter. Herein, a description of the guide roller units 14, 14 of the upper rail 11 and the lower rail 12 will be omitted. As illustrated in FIG. 6, a recessed portion 10*c* is formed at the quarter panel 10*b*. The recessed portion 10*c*, which is recessed towards an inside of the vehicle, extends in the longitudinal direction of the vehicle (i.e., in a direction perpendicularly going into FIG. 6). The center rail 13 is disposed in the recessed portion 10*c* of the quarter panel 10*b*. The center rail 13, which extends in the longitudinal direction of the vehicle, is formed in a U shape in cross section. Further, a first roller guide 13*a* is formed at a lower wall portion of the center rail 13, which extends towards the outer side of the vehicle. Still further, a second roller guide 13*b* is formed by downwardly bending an end portion of an upper wall portion of the center rail 13, which also extends towards the outer side of the vehicle.

A bracket 20*a* is securely attached to the slide door 20. The bracket 20 protrudes in an elongated form towards the inside of the vehicle from an inner side surface of the slide door 20. The guide roller unit 14 of the center rail 13 is pivotably movably connected to the bracket 20*a* about a pin 30 inserted through upper and lower wall portions of the bracket 20*a* which face each other.

Figure 7:
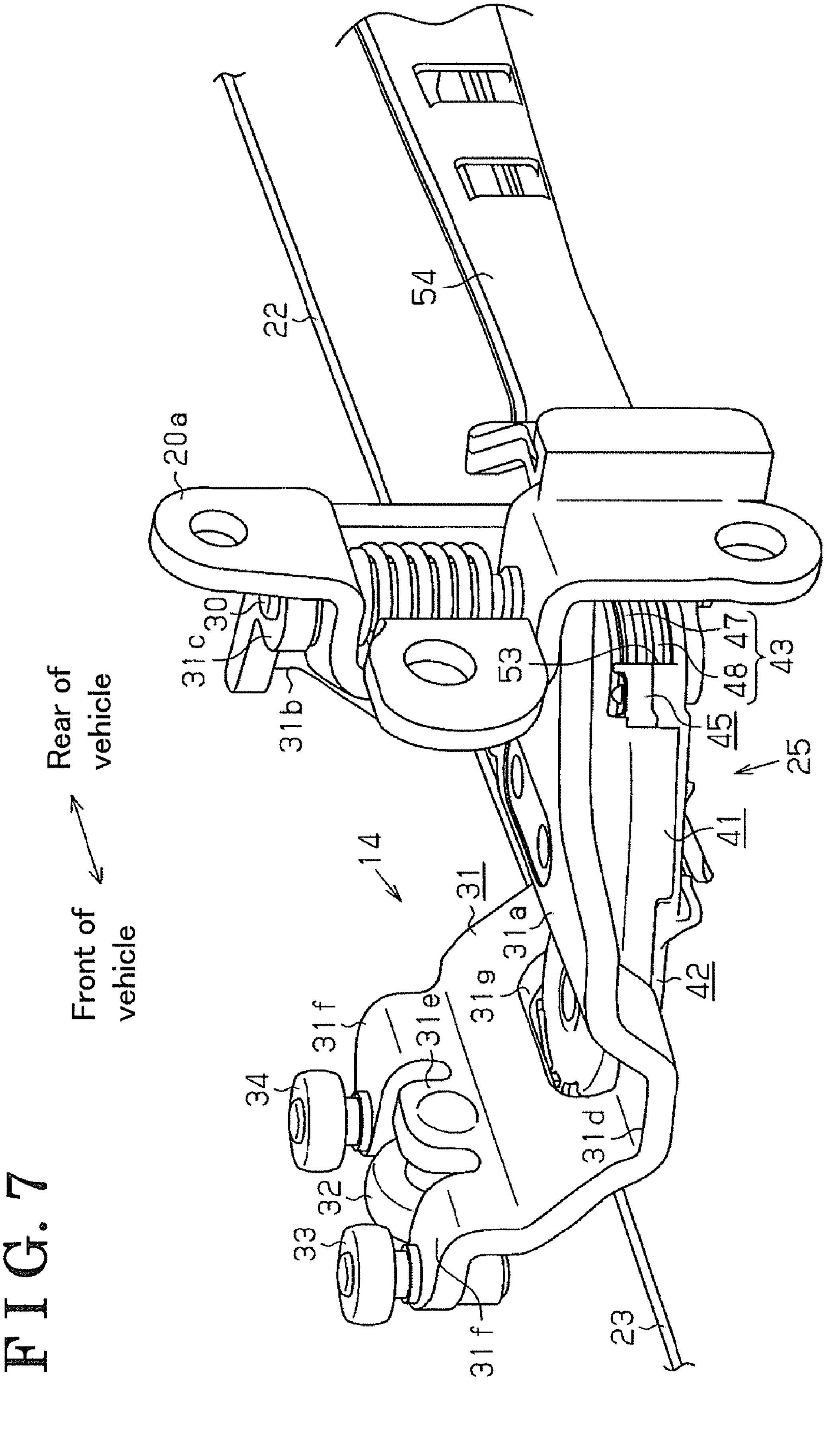
FIG. 7 is a perspective view illustrating the slide apparatus for the vehicle.
Figure 8:
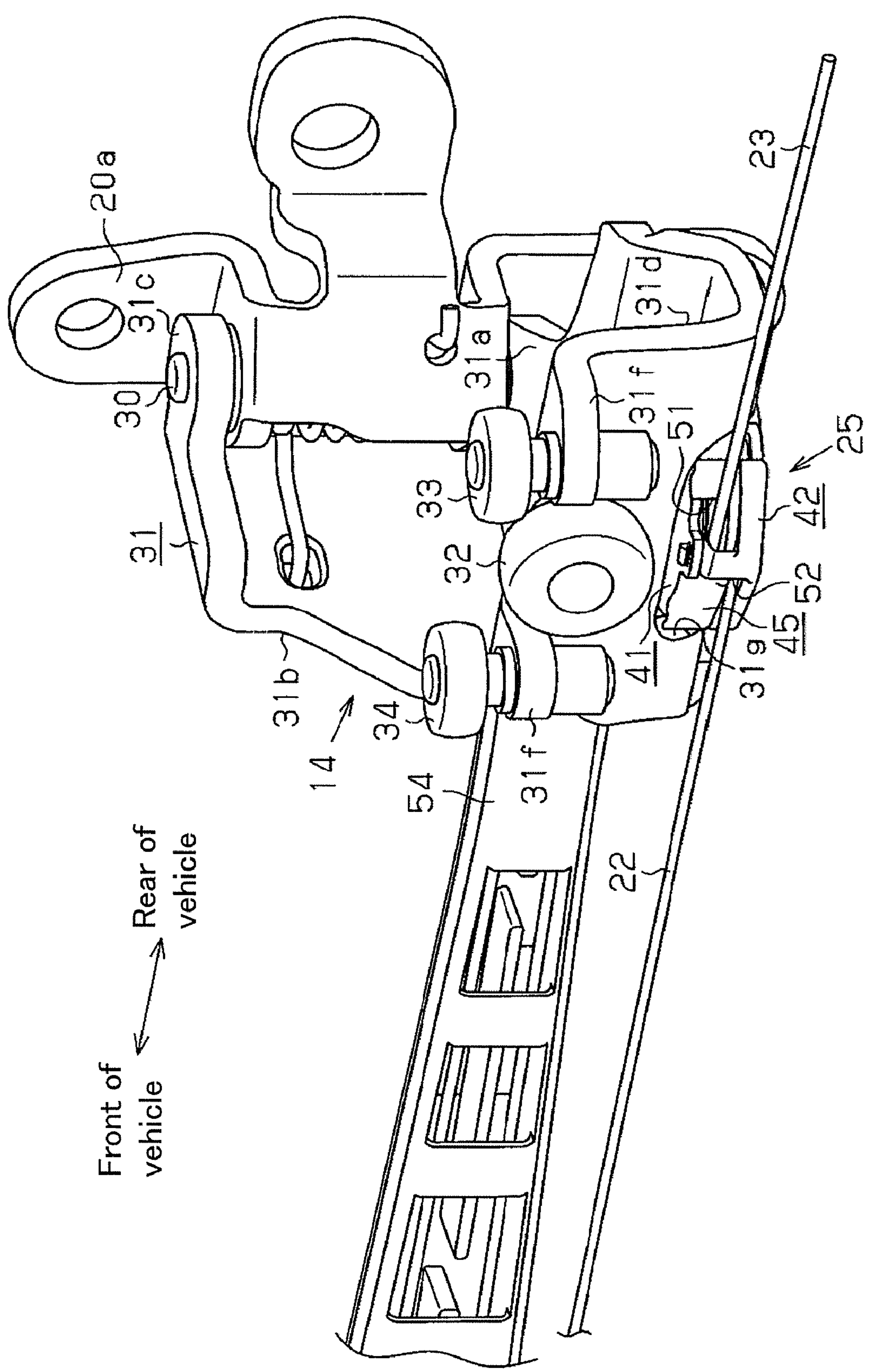
FIG. 8 is a perspective view illustrating the slide apparatus for the vehicle.

As illustrated in FIGS. 7 and 8, the guide roller unit 14 includes a base plate 31, a road roller 32 and vertical rollers 33 and 34. The base plate 31 includes a plate body 31*a*, a standing wall potion 31*b* and a flange 31*c*. The plate body 31*a* extends towards the inner side of the vehicle (towards the center rail 13). A lower end portion of the pin 30, which is inserted through the bracket 20*a*, is supported by the plate body 31*a*. The standing wall portion 31*b* is formed to stand from a front end of the plate body 31*a* at the vicinity of the pin 30. The flange 31*c* is formed by bending an upper end of the standing wall portion 31*b* so as to be in parallel with the plate body 31*a*. An upper end portion of the pin 30 is supported by the flange 31*c*.

Further, the base plate 31 includes a recessed portion 31*d*, which is formed in a V shape in cross section so as to be downwardly recessed at an intermediate portion of the plate body 31*a*. Still further, as best shown in FIG. 7, a first supporting portion 31*e* is formed by upwardly bending a longitudinally intermediate portion of an end portion of the recessed portion 31*d* which is adjacent to the center rail 13. Still further, a pair of second supporting portions 31*f* are formed by bending longitudinally front and rear side portions of the end portion of the recessed portion 31*d* being adjacent to the center rail 13, respectively, towards the inside of the vehicle. As illustrated therein, the first supporting potion 31*e* is interposed between the pair of second supporting portions 31*f*. The second supporting portions 31*f* extend to an inside of the center rail 13. The road roller 32 is supported by the first supporting portion 31*e* so as to be rotatable about a rotational shaft extending in a direction towards the center rail 13. Further, the vertical rollers 33 and 34 are supported by the pair of second supporting portions 31*f*, respectively, so as to be rotatable about corresponding rotational shafts extending in a vertical direction of the vehicle.

As illustrated in FIG. 6, the road roller 32 of the guide roller unit 14 is supported to the first roller guide 13*a* of the center rail 13 in a state where the vertical rollers 33 and 34 are rotatably movably mounted to the second roller guide 13*b*. Thus, the vertical rollers 33 and 34 of the guide roller unit 14 is rotatably moved along the second guide roller 13*b* of the center rail 13 and the road roller 32 is rotatably moved along the first roller guide 13*a*, thus moving the guide roller unit 14 in the longitudinal direction of the vehicle. Then, the slide door 20 is moved in the longitudinal direction of the vehicle in accordance with the longitudinal movement of the guide roller unit 14, thereby opening and closing the door opening 10*a* of the vehicle body 10. An opened side (an outer side) of the recessed portion 10*c* of the quarter panel 10*b*, which is provided with the center rail 13, is covered with a rail cover 35 which is made of metal material and/or resin material.

Further, the guide pulley unit 25 is connected to the base plate 31 at a lower side of the plate body 31*a* by means of a connecting member such as a bolt. Still further, an elongated opening 31*g* (see FIG. 7) is formed at the base plate 31 for preventing interference between the base plate 31 and the guide pulley unit 25 at the recessed portion 31*d*.

Figure 1:
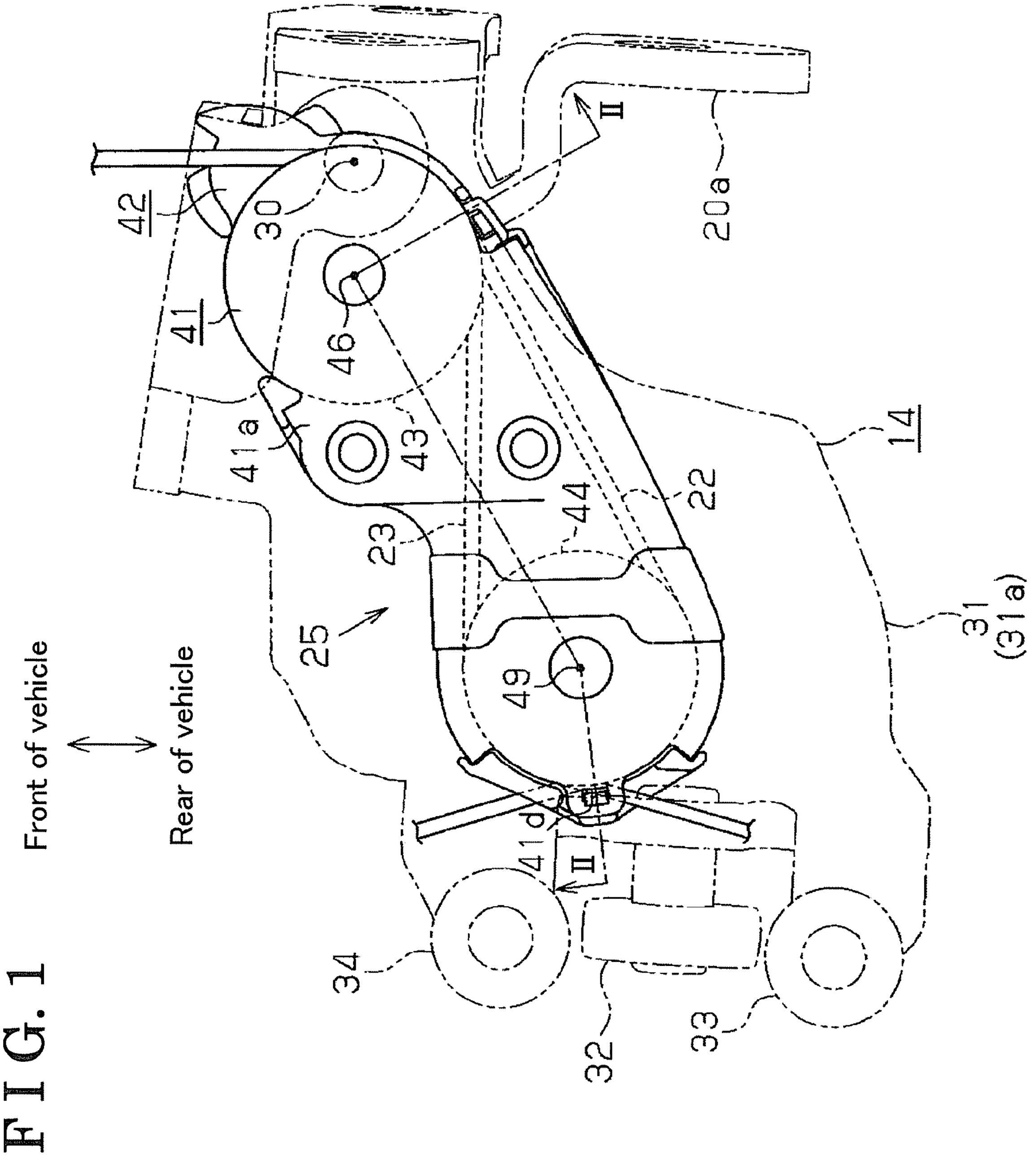
FIG. 1 is a planar view illustrating a guide pulley unit of a supporting member, according to an embodiment of the present invention.
Figure 2:
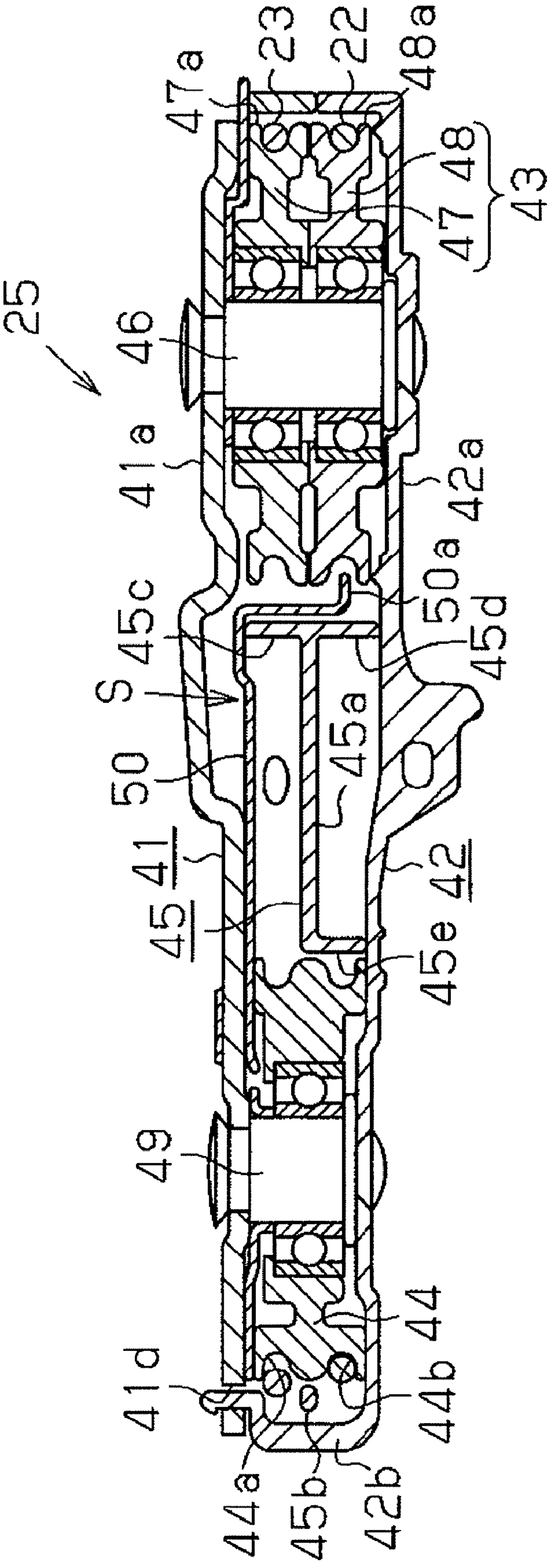
FIG. 2 is a cross sectional view illustrating the guide pulley unit taken along line II-II in FIG. 1.
Figure 3:
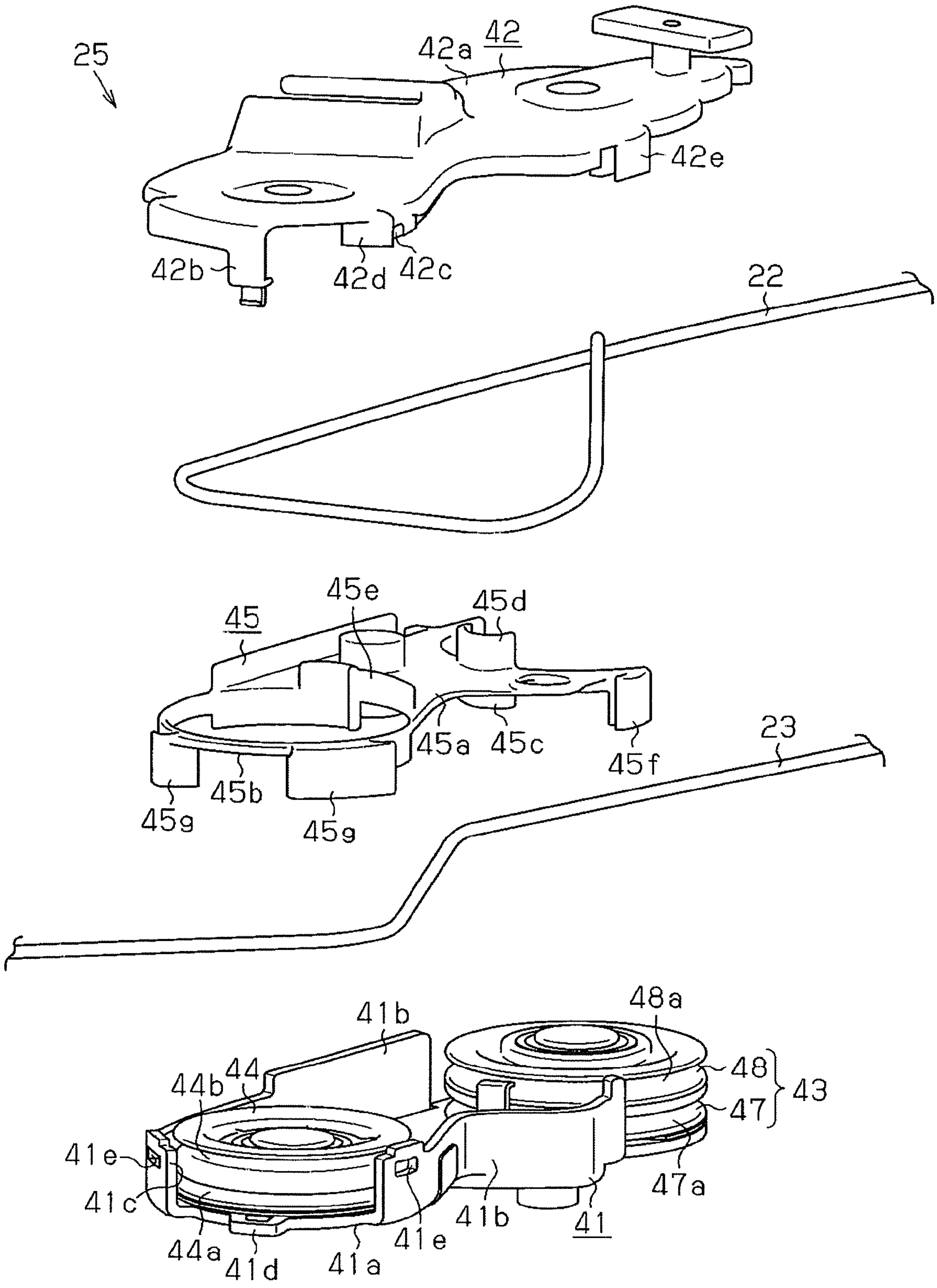
FIG. 3 is an exploded perspective view illustrating the guide pulley unit.

Next, the guide pulley unit 25 will be described in detail hereinafter. FIG. 1 is a planar view illustrating the guide pulley unit 25. FIG. 2 is a cross sectional view taken along line II-II in FIG. 1. FIG. 3 is an exploded perspective view illustrating the guide pulley unit 25. As illustrated therein, the guide pulley unit 25 includes a housing 41, a plate 42, plural guide pulleys 43 and 44 (two guide pulleys in the embodiment) and a separating plate 45. The housing 41 serves as a first housing member. The plate 42 serves as a second housing member. The separating plate 45 (see FIG. 2) serves as a separating member. The guide pulleys 43 and 44 are disposed in a manner where a rotational axis of the guide pulley 43 and a rotational axis of the guide pulley 44 are arranged in parallel with each other. Further, an axial central point of the rotational axis of the guide pulley 43 and an axial central point of the rotational axis of the guide pulley 44 are arranged on the same plane.

As illustrated in FIGS. 1 and 3, the housing 41 includes a cover wall portion 41*a* and a pair of sidewall portions 41*b*. The cover wall portion 41*a* extends along the plate body 31*a* of the base plate 31 and formed approximately in an oval shape. The sidewall portions 41*b* extend from longitudinally intermediate portions of the cover wall portion 41*a* along lateral peripheral end portions thereof, respectively. An opening 41*c* is formed between the sidewall portions 41*b* at one longitudinal side portion of the cover wall portion 41*a* (longitudinally left side portion in FIGS. 2 to 4), and an engagement recess 41*d* is formed at an intermediate portion of the opening 41*c*. Further, engagement recesses 41*e* are formed at the sidewall portions 41*b*, respectively.

With reference to FIG. 3, the plate 42 includes a bottom wall portion 42*a*, an engagement portion 42*b* and a pair of engagement nails 42*c*. An outer shape of the bottom wall portion 42*a* is substantially the same with an outer shape of the cover wall portion 41*a* and extends along the cover wall portion 41*a*. The engagement portion 42*b* extends from one longitudinal side portion of the bottom wall portion 42*a* (longitudinally left side portion in FIGS. 2 to 4) towards the cover wall portion 41*a* (i.e., towards the housing 41) so as to be engaged to the engagement recess 41*d* of the housing 41. The engagement nails 42*c* are engaged to the engagement recesses 41*e* of the housing 41, respectively. Further, the plate 42*d* includes a pair of engagement portions 42*d* and a pair of engagement portions 42*e*. Each of the engagement portions 42*d* (only one is illustrated in FIG. 3) extends from the longitudinally left side portion of the bottom wall portion 42*a* towards the cover wall portion 41*a* so as to be fitted (engaged) to an end portion of the corresponding sidewall portion 41*b* of the housing 41. Each of the engagement portions 42*e* (only one is illustrated in FIG. 3) extends from another longitudinal side portion of the bottom wall portion 42*a* (longitudinally right side portion in FIGS. 2 to 4) towards the cover wall portion 41*a* of the housing 41 so as to be fitted (engaged) to the end portion of the corresponding sidewall portion 41*b*.

As described above, the engagement portions 42*d* and the engagement portions 42*e* are engaged to the corresponding sidewall portions 41*b* of the housing 41, and the bottom wall portion 42*a* of the plate 42 is assembled to the sidewall portion 41*b*. Further, the engagement portion 42*b* is engaged to the engagement recess 41*d*, and the engagement nails 42*c* are respectively engaged to the engagement recesses 41*e*. Thus, the plate 42 is connectedly assembled on the housing 41. Further, an accommodating space S (see FIG. 2) is defined by the housing 41 and the plate 42.

As illustrated in FIGS. 1 and 2, the guide pulley 43 is provided at a first longitudinal space (right space in FIGS. 1 to 4) in the accommodating space S. The first longitudinal space is defined by a longitudinally right side portion of the cover wall portion 41*a* and the longitudinally right side portion of the bottom wall portion 42*a* and is located adjacent to the bracket 20*a*, i.e., to the slide door 20 (see FIG. 6). The guide pulley 43 is supported to the housing 41 and the plate 42 so as to be rotatable about a pin 46 which is inserted through and connected to the cover wall portion 41*a* and the bottom wall portion 42*a*. The guide pulley 43 includes a pulley member 47 and a pulley member 48, which are coaxially provided and allowed to rotate independently from each other. The pulley member 47 (serving as a second pulley) is disposed adjacently to the cover wall portion 41*a* of the housing 41 and is provided with a groove portion 47*a* (serving as a second groove portion). The second cable 23, which extends from the slide door 20 (from the intermediate pulley 24), is disposed in the groove portion 47*a* of the pulley member 47. The pulley member 48 (serving as a first pulley) is disposed adjacently to the bottom wall portion 42*a* of the plate 42 and is provided with a groove portion 48*a* (serving as a first groove portion). The first cable 22, which extends from the slide door 20, is disposed in the groove portion 48*a* of the second pulley member 48. In other words, the guide pulley 43 structured with the pulley members 47 and 48 includes a pair of groove portions 47*a* and 48*a*, which are arranged in parallel in an axial direction of the guide pulley 43 and to which the second and first cables 23 and 22 are respectively disposed.

The guide pulley 44 is provided at a second longitudinal space (left space in FIGS. 1 to 4) in the accommodating space S. The second longitudinal space is defined by the longitudinally left side portions of the cover wall portion 41*a* and the bottom wall portion 42*a* and is located adjacent to the center rail 13, i.e., to the vehicle body 10 (see FIG. 6). The guide pulley 44 is supported to the housing 41 and the plate 42 so as to be rotatable about a pin 49 which is inserted through and connected to the cover wall portion 41*a* and the bottom wall portion 42*a*. The guide pulley 44 is provided with groove portions 44*a* and 44*b*, which are arranged in parallel in an axial direction of the guide pulley 44. The second cable 23, which extends to the vehicle body 10 (to the cable guide 15), is disposed in the groove portion 44*a*, which is located adjacent to the cover wall portion 41*a* of the housing 41. The first cable 22, which extends to the vehicle body 10, is disposed in the groove portion 44*b*, which is located adjacent to the bottom wall portion 42*a* of the plate 42. The groove portion 44*b* of the guide pulley 44 serves as a first groove portion and the groove portion 44*a* serves as a second groove portion.

As illustrated in FIG. 6, the cable guide 15 is arranged to downwardly extend from an end portion of the first roller guide 13*a* of the center rail 13 so as to face a radially outer side portion of the guide pulley 44, i.e., a radially outer side portion being adjacent to the vehicle body 10.

Back to FIG. 1, the first cable 22 is disposed at a rear side portion of the guide pulley 43 (the pulley member 48) and a rear side portion of the guide pulley 44 and is turned forwardly via the guide pulley unit 25. On the other hand, the second cable 23 is disposed at the rear side portion of the guide pulley 43 (the pulley member 47) and a front side portion of the guide pulley 44 and is returned backwardly via the guide pulley unit 25. Accordingly, the first and second cables 22 and 23 are guided by the corresponding pulley members 48 and 47, each of which rotate in a direction being opposite to each other, and are guided by the rotation of the guide pulley 44. Thus, one of the first and second cables 22 and 23 is wound to the driving device 21 and the other one of the first and second cables 22 and 23 is reeled off (unwound) from the driving device 21. The first and second cables 22 and 23 exhibit a shape of a "6" at the guide pulley unit 25 when seen in a planar view. Therefore, the first and second cables 22 and 23 are guided by the guide pulleys 43 and 44 in accordance with a rotational movement (pivotal movement) of the guide roller unit 14 about the pin 30 relative to the slide door 20.

Further, as illustrated in FIG. 2, a pulley protection plate 50 is provided between the cover wall portion 41*a* of the housing 41 and a surface of the guide pulley 44 facing the cover wall portion 41*a*. The pulley protection plate 50 expands in a planar shape along the cover wall portion 41*a*. A nail portion 50*a* is formed by bending an end portion of the pulley protection plate 50, which is adjacent to the guide pulley 43, in an L shape so as to adjacently face the groove portion 48*a* of the second pulley member 48. The pulley protection plate 50 scratches off foreign objects, such as ice, attached to the groove portion 48*a* of the second pulley member 48 by means of the nail portion 50*a*.

As illustrated in FIGS. 2 and 3, the separating plate 45 is accommodated in the accommodating space S. Further, the separating plate 45 includes a body portion 45*a* and an arc portion 45*b*. The body portion 45*a* includes an outer shape which is substantially the same as the outer shape of the cover wall portion 41*a* while not having a surface facing an axial end surface (circular surface) of each of the guide pulleys 43 and 44. Further, the body portion 45*a* expands in a direction perpendicular to the axial direction of the guide pulleys 43 and 44. The arc portion 45*b* extends from the body portion 45*a*. Therefore, 45*a* and 45*b* surround an entire circumference of the guide pulley 44. The separating plate 45 further includes leg portions 45*c*, 45*d* and 45*e*. The leg portion 45*c* is formed by bending an end portion of the body portion 45*a*, which is adjacent to the guide pulley 43, towards the cover wall portion 41*a* so as to contact with the pulley protection plate 50 mounted on the cover wall portion 41*a*. The leg portion 45*d* is formed by bending the end portion of the body portion 45*a*, which is adjacent to the guide pulley 43, towards the bottom wall portion 42*a* of the plate 42 so as to contact with the bottom wall portion 42*a*. The leg portion 45*e* is formed by bending an end portion of the body portion 45*a*, which is adjacent to the guide pulley 44, towards the bottom wall portion 42*a* of the plate 42 so as to contact the bottom wall portion 42*a*. The separating plate 45 is supported by the leg portions 45*c*, 45*d* and 45*e* in the accommodating space S, thereby retaining the body portion 45*a* and the arc portion 45*b* at an axial position between the groove portions 47*a* and 48*a* of the guide pulley 43 and between the groove portions 44*a* and 44*b* of the guide pulley 44. Thus, the separating plate 45 separates the groove portions 47*a* and 48*a* of the guide pulley 43, which are arranged axially in parallel, and further separates the groove portions 44*a* and 44*b* of the guide pulley 44, which are arranged axially in parallel, by means of the body portion 45*a* and the arc portion 45*b*. Thus, the separating plate 45 prevents the first cable 22 and the second cable 23 from crossing each other, or interfering with each other.

The separating plate 45 still further includes a pair of engagement portions 45*f* and a pair of engagement portions 45*g*. The engagement portions 45*f* (only one is illustrated in FIG. 3) extend from the end portion of the body portion 45*a*, which is adjacent to the guide pulley 43, towards the cover wall portion 41*a* so that one of the engagement portions 45*f* is fitted to one of the sidewall portions 41*b* and the other one of the engagement portions 45*f* is fitted to the other one of the sidewall portions 41*b*. The engagement portions 45*g* extend from the end portion of the body portion 45*a*, which is adjacent to the guide pulley 44, towards the cover wall portion 41*a* so that one of the engagement portions 45*g* is fitted to the end portion of one of the sidewall portions 41*b* and the other one of the engagement portions 45*g* is fitted to the end portion of the other one of the sidewall portions 41*b*. Thus, the engagement portions 45*f* and 45*g* of the separating plate 45 are fitted to the corresponding sidewall portions 41*b*, and the leg portion 45*c* of the separating plate 45 is arranged to contact the pulley protection plate 50, thereby connecting the separating plate 45 to the housing 41.

As illustrated in FIG. 4, the separating plate 45 assembled on the housing 41 structures an opening 51 from which the second cable 23 exits out of the guide pulley unit 25, an opening 52 from which the first cable 22 exits out of the guide pulley unit 25, and an opening 53 from which both of the first and second cables 22 and 23 are inserted into the guide pulley unit 25. More specifically, the opening 51 is formed between the engagement portion 42*b* of the plate 42 and one of the engagement portions 45*g* of the separating plate 45. The opening 52 is formed above the other one of the engagement portions 45*g* of the separating plate 45, which faces the base wall portion 42*a* of the plate 42. The opening 53 is formed between the pair of engagement portions 45*f* which are fitted to the corresponding engagement portions 42*e* fitted to the sidewall portions 41*b* of the housing 41. The opening 53 is widely opened in a circumferential direction of the guide pulley 43. Therefore, the first and second cables 22 and 23 are allowed to move in accordance with a pivotal movement of the guide pulley unit 25 (the pivotal movement of the guide roller unit 14) about the pin 30.

The first cable 22, which is disposed at the guide pulleys 43 and 44, is lead into the guide pulley unit 25 from the slide door 20 through the opening 53 and is lead out of the guide pulley unit 25 towards the vehicle body 10 through the opening 52. Further, on the contrary, the first cable 22 is lead into the guide pulley unit 25 from the vehicle body 10 through the opening 52 and is lead out towards the slide door 20 through the opening 53. The second cable 23, which is disposed at the guide pulleys 43 and 44, is lead into the guide pulley unit 25 from the vehicle body 10 through the opening 51 and is lead out towards the slide door 20 through the opening 53. Further, on the contrary, the second cable 23 is lead into the guide pulley unit 25 from the slide door 20 through the opening 53 and is lead out of the guide pulley unit 25 towards the vehicle body 10 through the opening 51.

Thus, the first and second cables 22 and 23 are lead into and out of the guide pulley unit 25 through the openings 52 and 51 and then guided by the cable guide 15. Further, the first and second cables 22 and 23 are lead into and out of the guide pulley unit 25 through the opening 53 and then guided by an elongated casing 54 (see FIG. 7), which is attached to an inner side surface of the slide door 20.

Figure 4A:
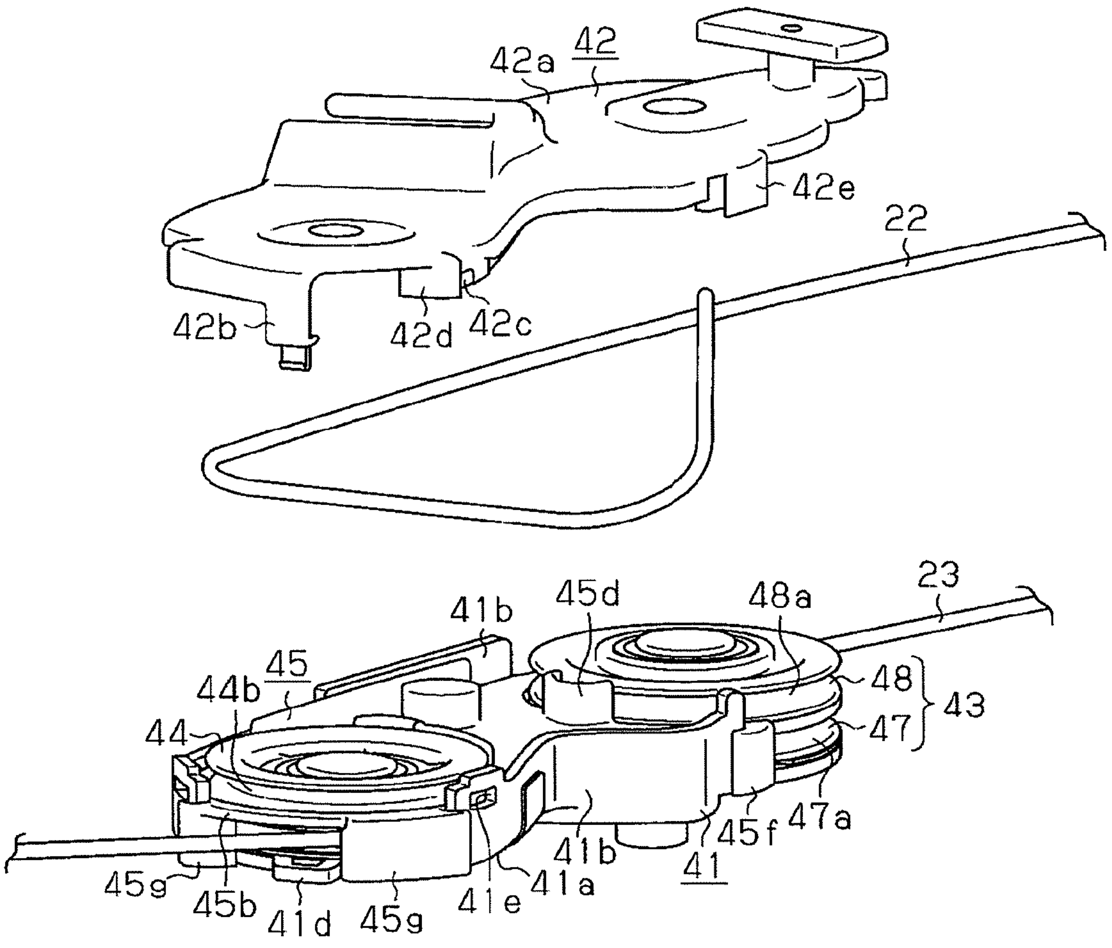
FIG. 4A is an explanatory view illustrating a process for structuring the guide pulley unit.
Figure 4B:
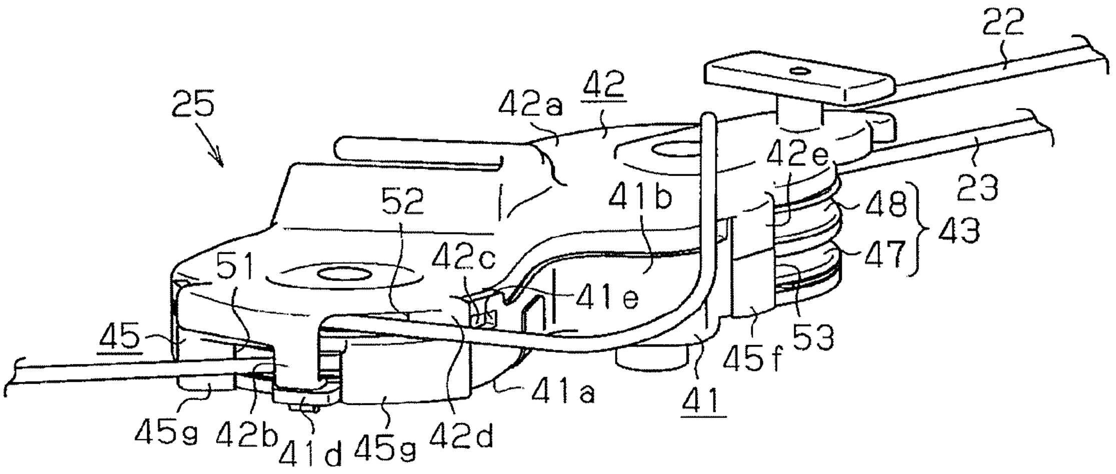
FIG. 4B is a perspective view illustrating an assembled manner of the guide pulley unit.

Herein, an assembling manner of the first and second cables 22 and 23 on the guide pulley unit 25 will be described with reference to FIGS. 3 and 4. As illustrated in FIG. 3, when assembling the first and second cables 22 and 23 to the guide pulleys 43 and 44 of the guide pulley unit 25, the guide pulleys 43 and 44 are firstly disposed at predetermined rotational positions, respectively, on the cover wall portion 41*a* of the housing 41. Then, the second cable 23 is disposed into the groove portion 47*a* of the guide pulley 43 and the groove portion 44*a* of the guide pulley 44 (i.e., the groove portions which are adjacent to the housing 41) so as to be disposed (fitted) in a path of each groove portions 44*a* and 47*a*. When the separating plate 45 is assembled on the guide pulley unit 25 under a state where the guide pulleys 43, 44 and the second cable 23 is assembled on the housing 41, the groove portion 47*a* of the guide pulley 43 and the groove portion 44*a* of the guide pulley 44, in which the second cable 23 is disposed (fitted), are separated from the guide grooves 48*a* and 44*b* of the guide pulleys 43 and 44 (see FIGS. 2 and 4A). Accordingly, the second cable 23 is prevented from being dislocated out of the groove portions 47*a* and 44*a* of the guide pulleys 43 and 44 by means of the separating plate 45. Further, even when the second cable 23 is dislocated without being fitted into the groove portions 47*a* and 44*a* of the guide pulleys 43 and 44, the second cable 23 is prevented from being fitted into the groove portions 48*a* and 44*b* of the guide pulleys 43 and 44 by means of the separating plate 45. Then, in a state described above, the first cable 22 is disposed (fitted) into the groove portion 48*a* of the guide pulley 43 and the groove portion 44*b* of the guide pulley 44 (i.e., the groove portions which are away from the housing 41) so as to be fitted in a path of each of the groove portions 48*a* and 44*b*. Herein, because the groove portions 47*a* and 44*a* of the guide pulleys 43 and 44 are separated from the groove portions 48*a* and 44*b* of the guide pulleys 43 and 44 by means of the separating plate 45, the first cable 22 is prevented from being fitted into the groove portions 47*a* and 44*a* by being dislocated out of the groove portions 48*a* and 44*b*. Then, the plate 42 is assembled on the housing 41 so as to cover the housing 41 (see FIG. 4B). Next, the guide pulleys 43 and 44 are securely connected to the housing 41 and the plate 42 by means of the corresponding pins 46 and 49, respectively, which are inserted through the housing 41, the guide pulleys 43, 44, and the plate 42. Thus, the guide pulleys 43 and 44, at which the first and second cables 22 and 23 are disposed, are accommodated in the accommodating space S in a manner where the guide pulleys 43 and 44 are rotatable about the pins 46 and 49, respectively, and an assembling process of the first and second cables 22 and 23 of the guide pulley unit 25 is completed. As described above, because the groove portions 47*a* and 44*a* of the corresponding guide pulleys 43 and 44 are separated from the groove portions 48*a* and 44*b* by means of the separating plate 45, the first and second cables 22 and 23 are readily and accurately assembled to the guide pulley unit 25.

As described above in detail, following effects may be obtained according to the embodiment. Firstly, because the groove portions 47*a* and 48*a* of the guide pulley 43 are separated from one another and further the groove portions 44*a* and 44*b* of the guide pulley 44 are separated from one another by means of the separating plate 45, the first and second cables 22 and 23 are readily and accurately assembled to the guide pulleys 43 and 44 of the guide pulley unit 25.

Secondly, according to the embodiment, the groove portions 47*a*, 48*a* of the guide pulley 43 and the groove portions 44*a*, 44*b* of the guide pulley 44 are appropriately separated by the body portion 45*a* of the separating plate 45 including a simple structure, in which the body portion 45*a* is supported by the plural leg portions 45*c*, 45*d* and 45*e* at an axial position between the groove portions 47*a*, 48*a* of the guide pulley 43 (i.e., an axially intermediate position between the groove portions 47*a* and 48*a*) and at an axial position between the groove portions 44*a*, 44*b* of the guide pulley 44 (i.e., an axially intermediate position between the groove portions 44*a* and 44*b*).

Thirdly, according to the embodiment, because an entire circumference of the guide pulley 44 is surrounded by the arc portion 45*b* and the body portion 45*a* of the separating plate 45 at the axial position between the groove portions 44*a* and 44*b*, the first cable 22 is restrained from being disposed into the other groove portion (the groove portion 44*a*), to which the first cable 22 is not to be fitted, along the entire circumference of the guide pulley 44. In the same manner, the second cable 23 is restrained from being disposed into the other groove portion (the groove portion 44*b*), to which the second cable 23 is not to be fitted, along the entire circumference of the guide pulley 44.

Fourthly, according to the embodiment, the guide pulley 43 includes the pulley member 47 including the groove portion 47*a* and the pulley member 48 including the groove portion 48*a*, the pulley members 47 and 48 which are arranged axially in parallel so as to rotate independently from each other. Therefore, a moving direction of the first cable 22 disposed at the pulley member 48 (first pulley member) and a moving direction of the second cable 23 disposed at the pulley member 47 (second pulley member) are defined independently, so that a dispositional manner of the first and second cables 22 and 23 at the guide pulleys 43 and 44 can be modified flexibly, i.e., the first and second cables 22 and 23 may be guided to exhibit a shape of an "8" (as will be described later), or a shape of a "6", for example.

Additionally, the above described embodiments will be modified as described hereinafter. According to the modified embodiment, the first and second cables 22 and 23 may be guided to exhibit a shape of an "8" at the guide pulley unit 25 when seen in a planar view. At this time, a center of the pivotal movement of the guide roller unit 14 (i.e., the pin 30) relative to the slide door 20 may be arranged coaxially with the rotational center (the pin 46) of the guide pulley 43. Then, the pulley members 47 and 48 of the guide pulley 43 may be integrally formed.

Further according to the modified embodiment, the separating plate 45 may be provided with an arc portion, which surrounds an entire circumference of the guide pulley 43 together with the body portion 45*a*, at the axial position between the groove portions 47*a* and 48*a* of the guide pulley 43.

Further, the leg portion 45*c* of the separating plate 45 may be arranged to directly contact the cover wall portion 41*a*. Still further, the guide pulley 44 may be structured with a first pulley member and a second pulley member, which are arranged axially in parallel to each other and are allowed to rotate independently from each other.

Still further, more than three guide pulleys may be provided at the guide pulley unit 25. Still further, though two cables (the first and second cables 22 and 23) are employed according to the embodiment described above, only one cable may be employed. In such a condition, the first position of the cable corresponds to the first cable and the end of the first portion corresponds to the end 26 of the first cable 22. Further, the second portion of the cable corresponds to the second cable and the end of the second portion corresponds to the end 27 of the second cable 23.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A slide door apparatus for a vehicle, comprising:

a driving device adapted to be mounted to a slide door supported by a vehicle body for opening and closing an opening formed at the vehicle body;

a guide pulley unit adapted to be mounted to the slide door and including a plurality of guide pulleys each having a first guide groove and a second guide groove arranged axially in parallel to each other, the guide pulley unit further including a first housing member and a second housing member for housing the plurality of guide pulleys to be rotatable therein, and a separating member provided between the first and second housing members for separating the first and second guide grooves of each of the plurality of guide pulleys;

a cable connected to the driving device to be wound to and unwound from the driving device, the cable including a first portion disposed into the first groove of each of the plurality of guide pulleys and an end of the first portion adapted to be connected to the vehicle body at a first side in a moving direction of the slide door, the cable further including a second portion disposed into the second groove of each of the plurality of guide pulleys and an end of the second portion adapted to be connected to the vehicle body at a second side in the moving direction of the slide door;

the separating member including a body portion extending in a direction perpendicular to an axial direction of the plurality of guide pulleys and a plurality of leg portions extending from the body portion to make contact with at least one of the first and second housing member and supporting the body portion at an axial position between the first and second guide grooves of each of the plurality of guide pulleys; and the separating member including an arc portion extending from the body portion to surround an entire circumference of at least one of the plurality of guide pulleys to be supported at the axial position between the first and second grooves of the guide pulley.

2. A slide door apparatus for a vehicle according to claim 1, further comprising:

a guiding rail adapted to be mounted to the vehicle body; and a supporting member adapted to be pivotably connected to the slide door and slidably guided by the guiding rail, wherein the guide pulley unit is mounted to the supporting member to guide the cable in accordance with a pivotal movement of the slide door relative to the supporting member by means of the plurality of guide pulleys.

3. A slide door apparatus for a vehicle according to claim 1, wherein one of the plurality of guide pulleys includes first and second pulley members respectively including the first and second guide grooves and arranged in parallel in the axial direction so as to be independently rotatable from each other.

* * * * *